United States Patent
Fornage

(10) Patent No.: US 9,583,946 B2
(45) Date of Patent: Feb. 28, 2017

(54) METHOD AND APPARATUS FOR POWER CONVERTER INPUT VOLTAGE REGULATION

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 915 days.

(21) Appl. No.: 13/116,587

(22) Filed: May 26, 2011

(65) Prior Publication Data
US 2011/0292705 A1 Dec. 1, 2011

Related U.S. Application Data

(60) Provisional application No. 61/348,984, filed on May 27, 2010.

(51) Int. Cl.
| H02M 7/537 | (2006.01) |
| H02J 3/38 | (2006.01) |
| H02M 7/48 | (2007.01) |
| H02M 1/00 | (2006.01) |

(52) U.S. Cl.
CPC ............ *H02J 3/383* (2013.01); *H02M 7/537* (2013.01); *H02M 7/48* (2013.01); *H02M 2001/007* (2013.01); *Y02E 10/563* (2013.01)

(58) Field of Classification Search
USPC .................... 363/15–16, 95, 97, 99
See application file for complete search history.

(56) References Cited

U.S. PATENT DOCUMENTS

| 4,862,057 | A | | 8/1989 | Contartese et al. |
| 5,742,496 | A | * | 4/1998 | Tsutsumi ................ 363/95 |
| 5,831,418 | A | * | 11/1998 | Kitagawa ................ 323/222 |
| 5,847,549 | A | | 12/1998 | Dodson, III |
| 6,037,755 | A | * | 3/2000 | Mao et al. .............. 323/222 |
| 6,465,931 | B2 | * | 10/2002 | Knowles et al. ....... 310/316.01 |
| 6,590,370 | B1 | | 7/2003 | Leach |
| 2004/0165408 | A1 | * | 8/2004 | West et al. ............. 363/131 |
| 2007/0223257 | A1 | * | 9/2007 | Sack ....................... 363/37 |
| 2007/0296390 | A1 | * | 12/2007 | Feigin et al. .......... 323/290 |
| 2008/0266922 | A1 | * | 10/2008 | Mumtaz et al. ....... 363/131 |
| 2009/0027933 | A1 | * | 1/2009 | Kajouke et al. ....... 363/97 |
| 2009/0140577 | A1 | * | 6/2009 | Fishman ................ 307/82 |

(Continued)

FOREIGN PATENT DOCUMENTS

| CN | 101651416 A | 2/2010 |
| EP | 2187510 A1 | 5/2010 |

OTHER PUBLICATIONS

International Search Report and Written Opinion dated Jan. 17, 2012 for PCT Application No. PCT/US2011/038354.

(Continued)

*Primary Examiner* — Jeffrey Gblende
(74) *Attorney, Agent, or Firm* — Moser Taboada

(57) ABSTRACT

A method and apparatus for regulating an input voltage to a power conversion module. In one embodiment, the method comprises computing a voltage regulation threshold based on an output voltage for the power conversion module; comparing an input voltage of the power conversion module to the voltage regulation threshold; and generating, when the input voltage satisfies the voltage regulation threshold, an average input voltage less than the voltage regulation threshold, wherein the average input voltage is generated from the input voltage.

20 Claims, 5 Drawing Sheets

(56) References Cited

U.S. PATENT DOCUMENTS

2009/0244947 A1* 10/2009 Fornage ..................... 363/136
2009/0262556 A1* 10/2009 Tomiyoshi et al. ............ 363/17
2009/0316447 A1    12/2009 Kim et al.
2010/0124087 A1     5/2010 Falk
2010/0206378 A1*   8/2010 Erickson et al. ............. 136/259

OTHER PUBLICATIONS

Pekik Argo Dahono; Teruo Kataoka; Yukihiko Sato, "Dual Relationships Between Voltage-Source and Current-Source Three-Phase Inverters and Its Applications", Department of Electrical Engineering, Bandung Institute of Technology, Bandung, Indonesia; Department of Electrical and Electronic Engineering, Tokyo Institute of Technology, Tokyo, Japan, 7 pages, no date.

* cited by examiner

METHOD AND APPARATUS FOR POWER CONVERTER INPUT VOLTAGE REGULATION

CROSS-REFERENCE TO RELATED APPLICATIONS

This application claims benefit of U.S. provisional patent application Ser. No. 61/348,984, filed May 27, 2010, which is herein incorporated in its entirety by reference.

BACKGROUND OF THE INVENTION

Field of the Invention

Embodiments of the present disclosure relate generally to power conversion and, in particular, to regulating an input voltage to a power converter.

Description of the Related Art

Use of distributed generators (DGs) to produce energy from renewable resources is steadily gaining commercial acceptance due to the rapid depletion of existing fossil fuels and the increasing costs of current methods of generating power. One such type of DG may be a solar power system comprising a plurality of photovoltaic (PV) modules that convert solar energy received from the sun into a direct current (DC). One or more inverters then convert the DC current from the PV modules into an alternating current (AC). The AC power generated may then be used to run appliances at a home or business, or may be coupled to the commercial power grid and sold to the commercial power company.

One type of inverter that may be utilized for such DC-AC power conversion is a current source inverter (CSI). A CSI inverter is the dual of a voltage source inverter (VSI); for a CSI, the DC power supply is configured as a current source rather than a voltage source as for the VSI. One advantage of the CSI is that it increases the voltage towards the grid, negating the need for an additional DC-DC boost stage generally required by a VSI. Such an increase in voltage requires that the input voltage to the CSI must be lower than its output voltage.

In some large-scale DG installations, such as utility-scale installations, the grid voltage may drop, requiring additional power to be injected from the DG onto the grid to maintain operation of the grid. Such a drop in grid voltage may result in an output voltage at the CSI that is lower than the CSI input voltage, causing an unstable condition where current generation by the CSI cannot be controlled.

Therefore, there is a need in the art for a method and apparatus for regulating an input voltage to a power conversion module.

SUMMARY OF THE INVENTION

Embodiments of the present invention generally relate to a method and apparatus for regulating an input voltage to a power conversion module. In one embodiment, the method comprises computing a voltage regulation threshold based on an output voltage for the power conversion module; comparing an input voltage of the power conversion module to the voltage regulation threshold; and generating, when the input voltage satisfies the voltage regulation threshold, an average input voltage less than the voltage regulation threshold, wherein the average input voltage is generated from the input voltage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
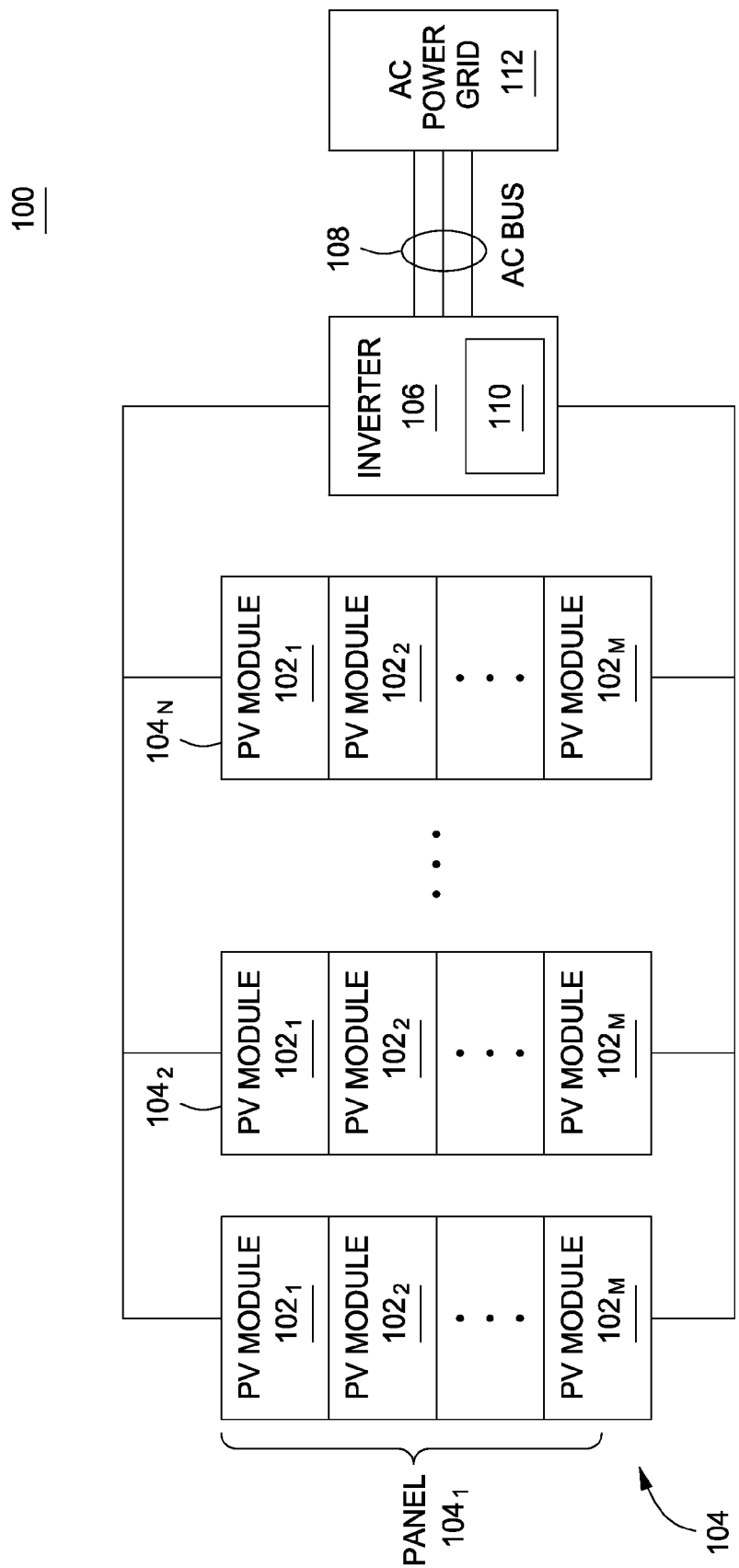
FIG. 1 is a block diagram of a solar power generation system in accordance with one or more embodiments of the present invention.

FIG. 1 is a block diagram of a solar power generation system 100 in accordance with one or more embodiments of the present invention. This diagram only portrays one variation of the myriad of possible system configurations. The present invention can function in a variety of distributed power generation environments and systems.

The solar power generation system 100 ("system 100") comprises a plurality of panels 104-1, 104-2, . . . , 104-N, collectively referred to as panels 104, coupled in parallel to an inverter 106. Each panel 104 comprises a plurality of photovoltaic (PV) modules 102-1, 102-2, . . . , 102-N, collectively referred to as PV modules 102. In some embodiments, one or more of the panels 104 may comprise a different number of PV modules 102 than other panels 104 (i.e., each of the panels 104 may not comprise the same number of PV modules 102). The PV modules 102 within a panel 104 are coupled in series, and the panels 104 are coupled in parallel for providing the generated DC power to the inverter 106. The PV modules 102 may be comprised of thin film solar cells that provide higher voltage/lower current than other types of PV module solar cells. In some alternative embodiments, the inverter 106 may receive DC power from one or more other renewable energy sources, such as wind farms, hydroelectric systems, or the like, in addition to or in place of the panels 104.

The inverter 106 is coupled to an AC commercial power grid 112 by an AC bus 108. The inverter 106 is a current source inverter (CSI) that converts the DC power from the panels 104 into AC power and meters out AC current that is in-phase with the AC commercial power grid voltage. The system 100 is a large-scale system, e.g., a utility-scale installation, for generating AC power on the order of megawatts (MW). In some embodiments, the inverter 106 generates a 277/480V three-phase, three-wire output; in other embodiments, the inverter 106 generates a three-phase, four-wire output and/or the inverter 106 may generate power at a different voltage level. Additionally or alternatively, generated energy may be stored for later use; for example, the generated energy may be stored utilizing batteries, heated water, hydro pumping, $H_2O$-to-hydrogen conversion, or the like. In one or more alternative embodiments, the inverter 106 may be an alternative type of power converter, such as a VSI or a DC-DC power converter.

In accordance with one or more embodiments of the present invention, the inverter 106 comprises an input voltage regulator 110 for ensuring that the inverter 106 remains operational when the voltage on the grid falls below a voltage regulation threshold, as described further below.

Figure 2:
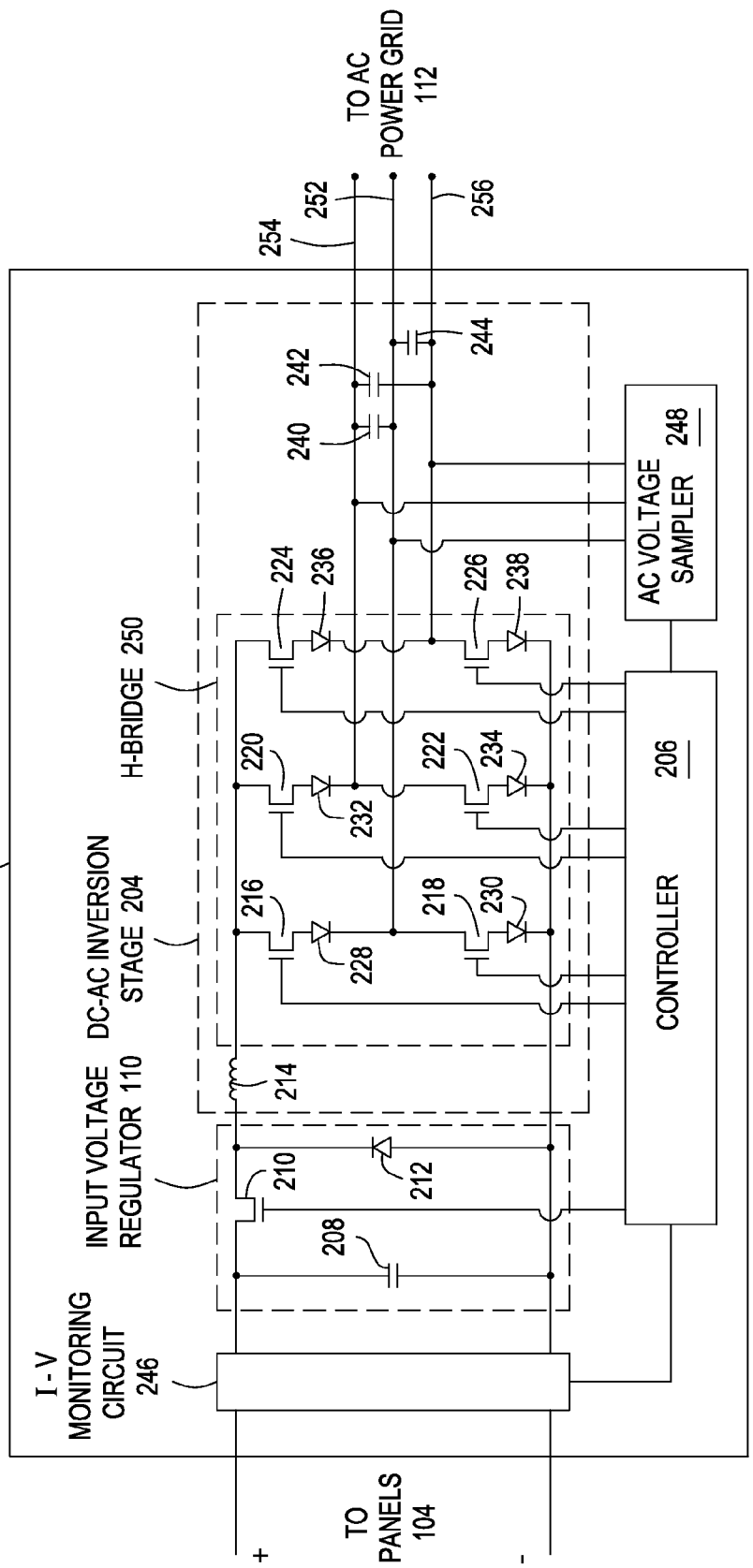
FIG. 2 is a block diagram of an inverter in accordance with one or more embodiments of the present invention.

FIG. 2 is a block diagram of an inverter 106 in accordance with one or more embodiments of the present invention. The inverter 106 comprises an I-V monitoring circuit 246, an input voltage regulator 110, a DC-AC inversion stage 204, an AC voltage sampler 248, and a controller 206. The I-V monitoring circuit 246 is coupled across the panels 104, and the DC-AC inversion stage 204 comprises a three-wire output coupled to the AC grid; alternatively, the DC-AC inversion stage 204 may comprise a four-wire output coupled to the AC grid. In some alternative embodiments, the input voltage regulator 110 may be a separate component (i.e., not contained within the inverter 106) that is coupled between the panels 104 and the inverter 106.

The input voltage regulator 110 comprises a capacitor 208, a switch 210, and a diode 212. A first terminal of the capacitor 208 is coupled to a first terminal of the switch 210, a second terminal of the switch 210 is coupled to a cathode terminal of the diode 212, and an anode terminal of the diode 212 is coupled to a second terminal of the capacitor 208. The capacitor 208 is coupled across the I-V monitoring circuit 246, and a control terminal of the switch 210 is coupled to the controller 206.

In some embodiments, the switch 210 may be an n-type metal-oxide-semiconductor field-effect transistor (MOSFET) switch and the first and second terminals are drain and source terminals, respectively. In other embodiments, the switch 210 may be a p-type MOSFET, an insulated gate bipolar transistor (IGBT), a gate turn-off (GTO) switch, a bipolar junction transistor (BJT), or the like, or some combination thereof.

The DC-AC inversion stage 204 comprises switches 216, 218, 220, 222, 224, and 226, each coupled in series with a reverse current blocking diode 228, 230, 232, 234, 236, and 238, respectively, and configured as a three-phase H-bridge 250. The switches 216, 218, 220, 222, 224, and 226 may be n-type MOSFETs, p-type MOSFETs, IGBTs, GTO switches, BJTs, or the like, or some combination thereof. A first terminal of the switch 216 is coupled to a first terminal of the switch 220 and a first terminal of the switch 224; a second terminal of the switch 216 is coupled to an anode terminal of the diode 228. A first terminal of the switch 218 is coupled to a cathode terminal of the diode 228, and a second terminal of the switch 218 is coupled to an anode terminal of the diode 230.

A second terminal of the switch 220 is coupled to an anode terminal of the diode 232. A first terminal of the switch 222 is coupled to a cathode terminal of the diode 232, and a second terminal of the switch 222 is coupled to an anode terminal of the diode 234. A second terminal of the switch 224 is coupled to an anode terminal of the diode 236. A first terminal of the switch 226 is coupled to a cathode terminal of the diode 236, and a second terminal of the switch 226 is coupled to an anode terminal of the diode 238. Control terminals of each of the switches 216, 218, 220, 222, 224, and 226 are coupled to the controller 206 for operatively controlling (i.e., activating/deactivating) the switches 216, 218, 220, 222, 224, and 226.

Cathode terminals of the diodes 230, 234, and 238 are coupled to the anode terminal of the diode 212. A first output line 252 is coupled to the cathode terminal of the diode 228, a second output line 254 is coupled to the cathode terminal of the diode 232, and a third output line 256 is coupled to the cathode terminal of the diode 236. In some alternative embodiments, the diodes 228, 230, 232, 234, 236, and 238 may be excluded and the switches 216, 218, 220, 222, 224, and 226 are capable of withstanding large reverse voltages, such as MOSFETs, BJTs, IGBTs, MOS controlled thyristors (MCTs), integrated gate-commutated thyristors (IGCTs), GTOs, or the like.

The DC-AC inversion stage 204 further comprises an inductor 214 and capacitors 240, 242, and 244. The inductor 214 is coupled between the cathode terminal of the diode 212 and the first terminal of the switch 216. The capacitor 240 is coupled between the output lines 252 and 254, the capacitor 242 is coupled between the output lines 254 and 256, and the capacitor 244 is coupled between the output lines 252 and 256.

The I-V monitoring circuit 246 samples the DC current and voltage from the panels 104, for example at a rate between 10-100 kHz, and couples the DC current and voltage samples to the controller 206; in some embodiments, the I-V monitoring circuit 246 comprises analog to digital converters (ADC) for generating the DC current and voltage samples. The AC voltage sampler 248 is coupled to each of the output lines 252, 254, and 256 for sampling the AC line voltage, for example at a rate between 10-100 kHz, and is further coupled to the controller 206 for providing the AC voltage samples to the controller 206. In some embodiments, the AC voltage sampler comprises a voltage sense transformer and an analog to digital converter (ADC) for generating the AC voltage samples.

Based on received DC current, DC voltage, and AC voltage samples, the controller 206 controls the H-bridge 250 by synchronously operating (i.e., activating/deactivating) the switches 216, 218, 220, 222, 224, and 226 to convert the DC power from the panels 104 to AC power. In some embodiments, the controller 206 may utilize pulse width modulation (PWM) techniques for controlling the H-bridge 250; alternatively, Space Vector PWM, predictive modulation, or a similar technique may be utilized. The controller 206 may additionally perform maximum power point tracking (MPPT) for operating the panels 104 at a maximum power point (MPP).

The controller 206 also compares the input voltage received from the panels 104 (i.e., one or more of the DC current samples) to a voltage regulation threshold for operating the input voltage regulator 110. The voltage regulation threshold is based on the line voltage of the AC power grid 112 (i.e., the grid voltage). While the input voltage from the panels 104 remains below the voltage regulation threshold, the controller 206 maintains the switch 210 in an active (i.e., "on") state and current flows continuously from the panels 104 to the DC-AC inversion stage 204. When the input voltage from the panels 104 is equal to or exceeds the voltage regulation threshold, the controller 206 periodically activates/deactivates the switch 210, for example by PWM control, Space Vector PWM, predictive modulation, or a similar technique, such that the average input voltage to the DC-AC inversion stage 204 is less than the voltage regulation threshold. Based upon the input voltage from the panels 104, the controller 106 may determine a suitable switching rate for operating the switch 210 to achieve an average DC-AC inversion stage input voltage below the voltage regulation threshold.

In one or more alternative embodiments, the inverter 106 may comprise a voltage monitoring circuit (not shown) between the input voltage regulator 110 and the DC-AC inversion stage 204 for monitoring the input voltage to the DC-AC inversion stage 204. In some such embodiments, the monitored DC-AC inversion stage input voltage may be utilized by the controller 206 for determining the switching rate of the switch 210.

In some embodiments, the voltage regulation threshold may be set as follows:

$$\text{voltage regulation threshold} = V\text{out} - \text{margin} \quad (1)$$

where Vout=the lowest rectified line-to-line voltage of the AC power grid 112 and margin is a set value. In some embodiments, the voltage regulation threshold may be periodically recomputed based upon the energy storage of the capacitor 208; for example, the voltage regulation threshold may be recomputed on the order of every millisecond. In some embodiments, the value of margin may be preset and remain fixed; alternatively, the value of margin may be adjustable. The input voltage regulator 110 is duty cycle controlled such that an average voltage across the diode 212 satisfies Equation (1).

Figure 3:
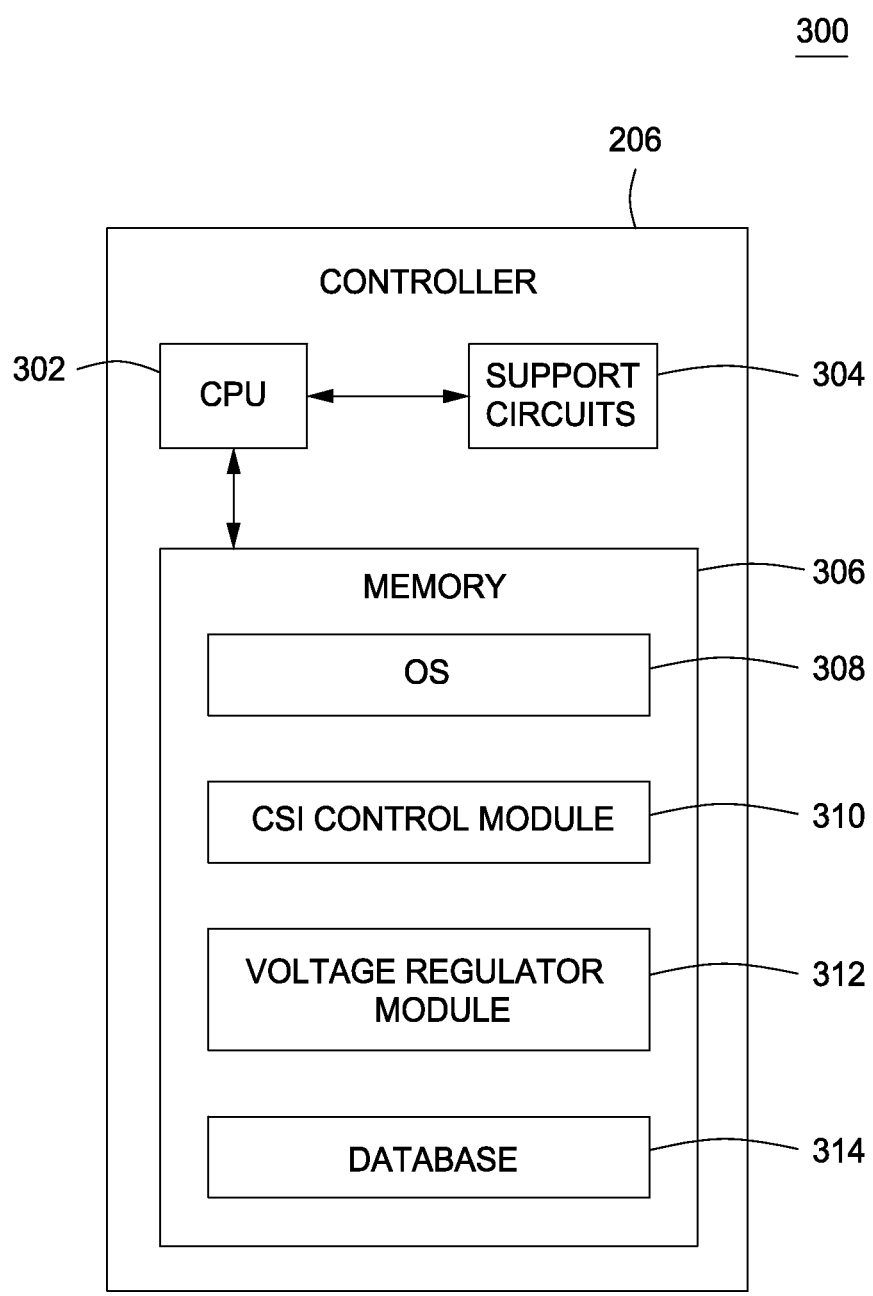
FIG. 3 is a block diagram of a controller in accordance with one or more embodiments of the present invention.

FIG. 3 is a block diagram of a controller 206 in accordance with one or more embodiments of the present invention. The controller 206 comprises support circuits 304 and a memory 306, each coupled to a central processing unit (CPU) 302. The CPU 302 may comprise one or more conventionally available microprocessors. Alternatively, the CPU 302 may include one or more application specific integrated circuits (ASIC). The support circuits 304 are well known circuits used to promote functionality of the CPU 302. Such circuits include, but are not limited to, a cache, power supplies, clock circuits, buses, network cards, input/output (I/O) circuits, and the like. The controller 206 may be implemented using a general purpose computer that, when executing particular software, becomes a specific purpose computer for performing various embodiments of the present invention.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308 of the controller 206 that can be supported by the CPU capabilities.

The memory 306 may store various forms of application software, such as a CSI control module 310 for controlling operation of the inverter 106 and a voltage regulator module 312. The voltage regulator module 312 may control the operation of the input voltage regulator 110; for example, the voltage regulator module 312 may determine the voltage regulation threshold, compare the input voltage from the panels 104 to the voltage regulation threshold, determine switching rates for the switch 210, generate control signals for the switch 210, determine one or more margin values, and the like.

The memory 306 may additionally store a database 314 for storing data related to the operation of the inverter 106 and/or the present invention. Such data may include one or more voltage regulation thresholds, data pertaining to input voltage from the panels 104 and/or comparison of the input voltage to the voltage regulation threshold, data pertaining to switching rates of the switch 210, one or more margin values, and the like.

Figure 4:
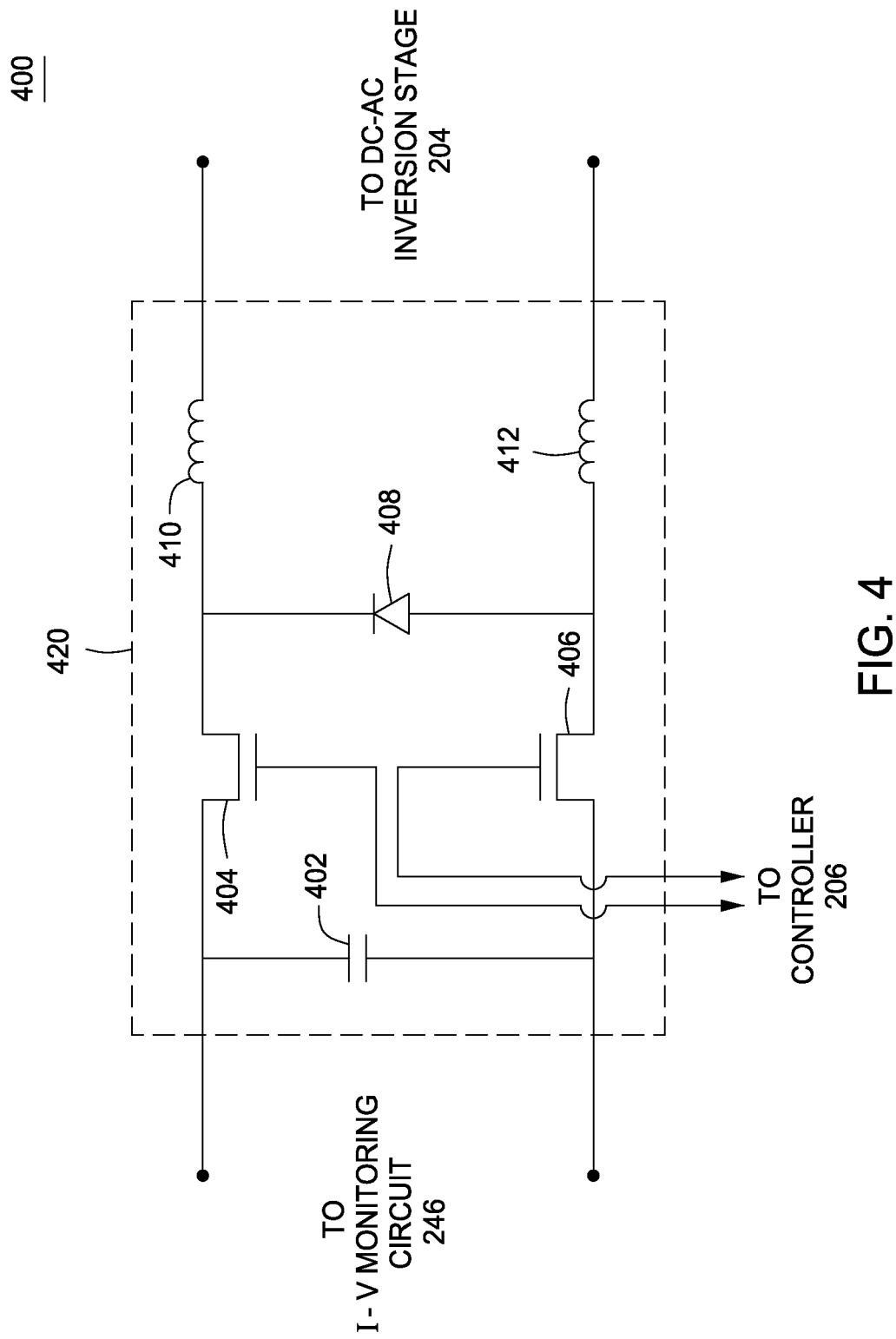
FIG. 4 is a block diagram of an alternative input voltage regulator in accordance with one or more embodiments of the present invention.

FIG. 4 is a block diagram of an alternative input voltage regulator 420 in accordance with one or more embodiments of the present invention. The input voltage regulator 420 is an alternative embodiment of the input voltage regulator 110 and comprises a capacitor 402, a first switch 404, a second switch 406, a diode 408, a first inductor 410, and a second inductor 412. The capacitor 402 is coupled across the I-V monitoring circuit 246. A first terminal of the capacitor 402 is coupled to a first terminal of the first switch 404, and a second terminal of the capacitor 402 is coupled to a second terminal of the second switch 406. Control terminals of the first and second switches 404 and 406 are coupled to the controller 206 for operating (i.e., activating/deactivating) the first and second switches 404 and 406.

A cathode terminal of the diode 408 is coupled to a second terminal of the first switch 404 and to a first terminal of the first inductor 410. An anode terminal of the diode 408 is coupled to a first terminal of the second switch 406 and to a first terminal of the second inductor 412. Second terminals of the first and second inductors 410 and 412 are coupled across the DC-AC inversion stage 204. The inductors 410 and 412 have the same inductance. In some embodiments, the first and second inductors 410 and 412 may have a common core, i.e., the first and second inductors 410 and 412 may be wound on the same core; the first and second inductors 410 and 412 may be built on a single magnetic circuit.

In some embodiments, the first and second switches 404 and 406 may be MOSFET switches, where the first and second terminals are drain and source terminals, respectively, and the control terminals are gate terminals. In other embodiments, the first and second switches 404 and 406 may be p-type MOSFETs, insulated gate bipolar transistor (IGBT), a gate turn-off (GTO) switch, bipolar junction transistors (BJT), or the like, or some combination thereof.

Analogous to the operation of the input voltage regulator 110, the controller 206 compares the input voltage from the panels 104 (i.e., one or more of the DC voltage samples) to a voltage regulation threshold, i.e., the voltage regulation threshold of Equation (1), for operating the input voltage regulator 420. The voltage regulation threshold may be periodically recomputed based upon the energy storage of the capacitor 402 (e.g., on the order of every millisecond). While the input voltage from the panels 104 remains below the voltage regulation threshold, the controller 206 maintains the first and second switches 404 and 406 in an active (i.e., "on") state and current flows continuously from the panels 104 to the DC-AC inversion stage 204.

When the input voltage from the panels 104 is equal to or exceeds the voltage regulation threshold, the controller 206 simultaneously activates/deactivates (e.g., by identical drive signals) the first and second switches 404 and 406, for example by PWM control, Space Vector PWM, predictive modulation, or a similar technique, such that the average input voltage to the DC-AC inversion stage 204 is less than the voltage regulation threshold. Based upon the input voltage from the panels 104, the controller 206 may determine a suitable switching rate for operating the first and second switches 404 and 406 to achieve an average DC-AC inversion stage input voltage below the voltage regulation threshold; the input voltage regulator 420 is duty cycle controlled such that an average voltage across the diode 408 satisfies Equation (1). The input voltage regulator 420 thus provides fully symmetric switching that reduces the input voltage to the DC-AC inversion stage 204 (i.e., maintains an average voltage across the diode 408 that satisfies Equation (1)) and eliminates any common mode current to the AC power grid 112. The circuit thus is balanced, thereby reducing either conducted or radiated common mode emissions.

As previously described with respect to Equation (1), the value of margin may be preset and remain fixed; alternatively, the value of margin may be adjustable.

Figure 5:
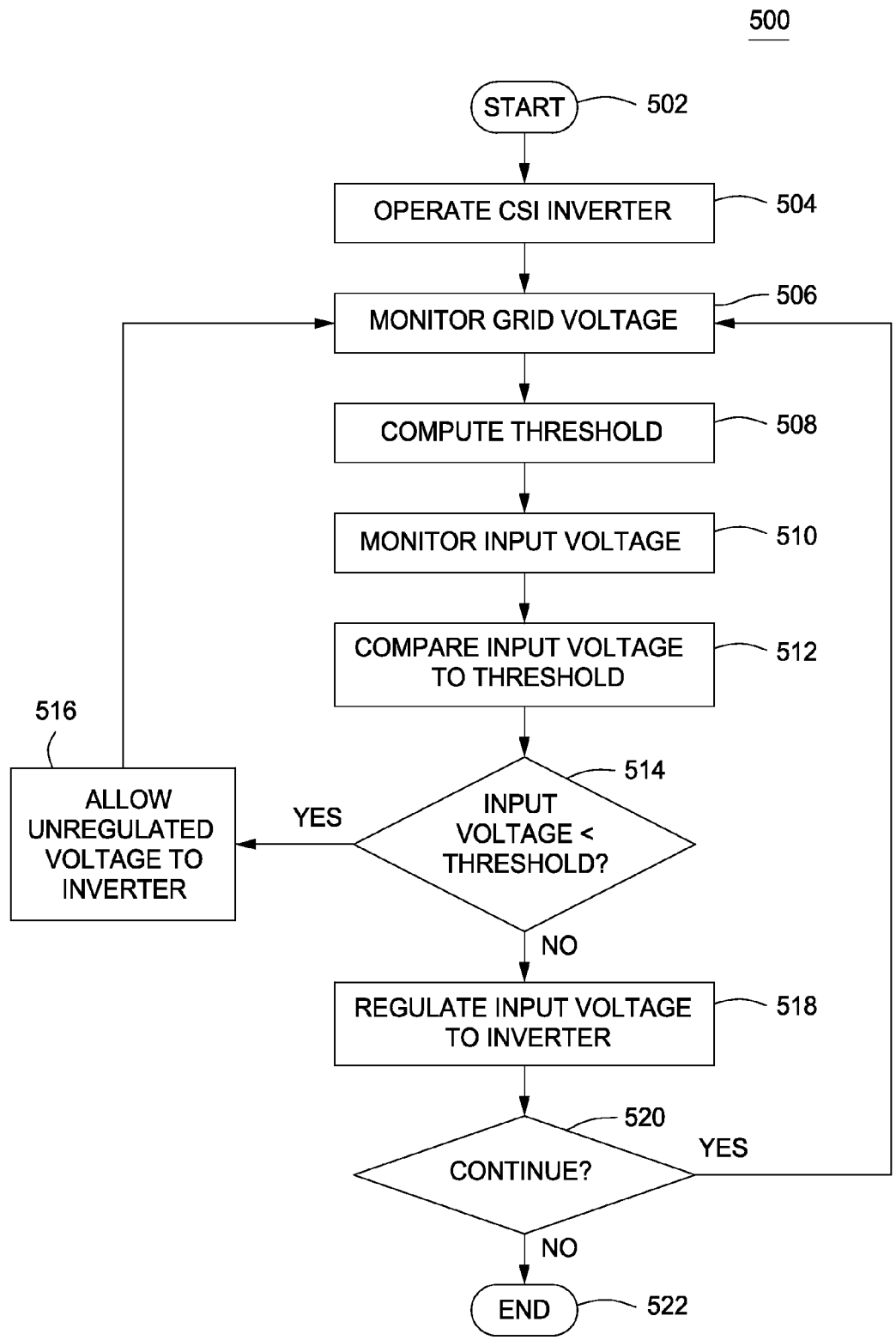
FIG. 5 is a flow diagram of a method for regulating an input voltage to an inverter in accordance with one or more embodiments of the present invention.

FIG. 5 is a flow diagram of a method 500 for regulating an input voltage to an inverter in accordance with one or more embodiments of the present invention. In some embodiments, the inverter is a current source inverter (CSI) that is part of a utility-scale installation for generating AC power on the order of megawatts (e.g., the inverter 106). The inverter may receive DC power from a plurality of panels that each comprise photovoltaic (PV) modules (e.g., the panels 104 comprising the PV modules 102) and couple the generated AC power to the commercial power grid. In one or more alternative embodiments, the inverter may receive DC power from one or more other renewable energy sources, such as wind farms, hydroelectric systems, or the like, in addition to or in place of the panels. In some alternative embodiments, the inverter may be a voltage source inverter (VSI) or a DC-DC power converter.

The method 500 begins at step 502 and proceeds to step 504. At step 504, the inverter is operated to convert the received DC power to AC power and couple the AC power to the commercial power grid. At step 506, the commercial power grid voltage is monitored. In some embodiments, the grid voltage may be sampled at a rate, for example, between 10-100 kHz; in some such embodiments, the inverter may comprise an AC voltage sampler for obtaining the grid voltage samples.

The method 500 proceeds to step 508, where a voltage regulation threshold is determined. In some embodiments, the voltage regulation threshold may be computed as $$\text{voltage regulation threshold} = V_{out} - \text{margin} \quad (2)$$

where Vout=the lowest rectified line to line voltage of the commercial power grid and margin is a set value. In some embodiments, the voltage regulation threshold may be recomputed on the order of every millisecond. In some embodiments, the value of margin may be preset and remain fixed; alternatively, the value of margin may be adjustable.

The method 500 proceeds to step 510. At step 510, the input voltage to the inverter (i.e., the DC voltage from the PV panels) is monitored. In some embodiments, the inverter input voltage may be sampled, for example, at a rate between 10-100 kHz; in some such embodiments, the inverter may comprise a monitoring circuit for obtaining the input voltage samples. At step 512, the input voltage (i.e., one or more of the DC voltage samples) is compared to the voltage regulation threshold; at step 514, a determination is made whether the input voltage is below the voltage regulation threshold. If, at step 514, it is determined that that input voltage is below the voltage regulation threshold, the method 500 proceeds to step 516. At step 516, the input voltage to the inverter is allowed to continue unregulated. In some embodiments, current flow from the PV panels to the inverter is allowed to continue unaltered, for example, by controlling one or more switches. The method 500 then returns to step 506.

If, at step 514, it is determined that the input voltage is equal to or exceeds the voltage regulation threshold, the method 500 proceeds to step 518. At step 518, the voltage input to the inverter is regulated such that an average input voltage to the inverter is less than the voltage regulation threshold. In some embodiments, the input voltage is regulated by periodically activating/deactivating one or more switches that control current flow from the panels to the inverter. In some such embodiments, pulse width modulation (PWM) control of the switch or switches may be employed to control the flow of current from the panels such that the desired average input voltage to the inverter is achieved; alternatively, Space Vector PWM, predictive modulation, or a similar technique may be utilized. In some embodiments, two switches may be utilized in a symmetric switching system, such as the input voltage regulator 420, for eliminating any common mode current to the commercial power grid.

The method 500 proceeds to step 520, where a determination is made whether to continue operating the inverter. If, at step 520, it is determined to continue operating the inverter, the method 500 returns to step 506. If, at step 520, it is determined to discontinue operating the inverter, the method 500 proceeds to step 522 where the method 500 ends.

The foregoing description of embodiments of the invention comprises a number of elements, devices, circuits and/or assemblies that perform various functions as described. These elements, devices, circuits, and/or assemblies are exemplary implementations of means for performing their respectively described functions While the foregoing is directed to embodiments of the present invention, other and further embodiments of the invention may be devised without departing from the basic scope thereof, and the scope thereof is determined by the claims that follow.

The invention claimed is:

1. A method for regulating an input voltage to a DC/AC power conversion module, comprising:
    computing a voltage regulation threshold based on an AC line voltage of a power grid to which the DC/AC power conversion module is coupled;
    comparing a value of the input voltage of the DC/AC power conversion module to the voltage regulation threshold; and
    modifying the input voltage to generate a modified input voltage when the value of the input voltage exceeds the voltage regulation threshold, wherein the modified input voltage has an average voltage value that is less than the voltage regulation threshold such that the input voltage or the modified input voltage is maintained at a level that is less than the voltage regulation threshold.

2. The method of claim 1, wherein generating the modified input voltage comprises driving at least one switch.

3. The method of claim 2, wherein the modified input voltage is generated via fully symmetric switching.

4. The method of claim 2, further comprising determining a switching rate, based on the value of the input voltage, for driving the at least one switch.

5. The method of claim 1, wherein the voltage regulation threshold is based on a lowest rectified line-to-line voltage value of an AC line coupled to the DC/AC power conversion module.

6. The method of claim 5, wherein the voltage regulation threshold is equal to a difference between the AC line voltage and a set value margin.

7. The method of claim 2, wherein the at least one switch is driven using at least one of pulse width modulation (PWM), Space Vector PWM, or predictive modulation.

8. Apparatus for regulating an input voltage to a DC/AC power conversion module, comprising:
    a voltage regulator module for (i) computing a voltage regulation threshold based on an AC line voltage of a power grid to which the DC/AC power conversion module is coupled; (ii) comparing a value of the input voltage of the DC/AC power conversion module to the voltage regulation threshold; and (iii) driving an input voltage regulator to generate a modified input voltage when the value of the input voltage exceeds the voltage regulation threshold, wherein the modified input voltage has an average voltage value that is less than the voltage regulation threshold such that the input voltage or the modified input voltage is maintained at a level that is less than the voltage regulation threshold.

9. The apparatus of claim 8, further comprising the input voltage regulator, wherein the voltage regulator module drives at least one switch of the input voltage regulator to modify the input voltage.

10. The apparatus of claim 9, wherein the input voltage regulator provides fully symmetric switching.

11. The apparatus of claim 9, wherein the voltage regulator module determines a switching rate, based on the value of the input voltage, for driving the at least one switch to generate the input voltage.

12. The apparatus of claim 8, wherein the voltage regulation threshold is a lowest rectified line-to-line voltage value of an AC line coupled to the DC/AC power conversion module.

13. The apparatus of claim 12, wherein the voltage regulation threshold is equal to a difference between the AC line voltage and a set value margin.

14. The apparatus of claim 9, wherein the at least one switch is driven using at least one of pulse width modulation (PWM), Space Vector PWM, or predictive modulation.

15. A power inverter comprising:
an input voltage regulator receiving an input voltage;
a DC-AC inversion stage comprising at least an H-bridge circuit;
an AC voltage sampler coupled to an AC line of a power grid for measuring an AC line voltage of the power grid to which the power inverter is coupled; and
a controller operative to receive AC voltage samples to determine a voltage regulation threshold, and control the input voltage regulator to generate a modified input voltage that is maintained at a level that is less than the voltage regulation threshold.

16. The power inverter of claim 15, wherein the input voltage regulator further comprises at least one switch driven to generate the modified input voltage as an average input voltage to the DC-AC inversion stage by fully symmetric switching.

17. The power inverter of claim 16, wherein the controller receives samples of the input voltage from an I-V monitoring circuit to determine a switching rate, based on the value of the input voltage, for driving the at least one switch to generate the modified input voltage.

18. The power inverter of claim 17, wherein the I-V monitoring circuit is coupled between an input of the power inverter and the input voltage regulator.

19. The power inverter of claim 15, wherein an input of the DC-AC inversion stage is coupled to an output of the input voltage regulator by an inductor.

20. The power inverter of claim 15, further comprising a voltage monitoring circuit coupled between the input voltage regulator and the DC-AC inversion stage, such that the voltage monitoring circuit monitors the input voltage.

* * * * *